United States Patent [19]

Yamada

[11] Patent Number: 5,515,355
[45] Date of Patent: May 7, 1996

[54] LIGHT MODULATOR AND OPTICAL HEAD ADJUSTMENT METHOD

[75] Inventor: Fumiaki Yamada, Yokohama, Japan

[73] Assignee: International Business Machines Corporation, Armonk, N.Y.

[21] Appl. No.: 285,681

[22] Filed: Aug. 4, 1994

[30] Foreign Application Priority Data

Aug. 24, 1993 [JP] Japan .................... 5-209572

[51] Int. Cl.⁶ .................................................. G11B 7/00
[52] U.S. Cl. .................................. 369/121; 369/112
[58] Field of Search .................. 369/112, 44.23, 369/44.24, 120, 121, 44.14, 44.15, 44.41, 44.42; 250/201.5; 356/138; 359/629, 637, 638, 639

[56] References Cited

U.S. PATENT DOCUMENTS 5,410,532   4/1995   Ohno et al. ................... 369/112

FOREIGN PATENT DOCUMENTS 63-01433   1/1988   Japan .
2081334    3/1990   Japan .
2232825    9/1990   Japan .
2294944   12/1990   Japan .

*Primary Examiner*—Nabil Z. Hindi
*Attorney, Agent, or Firm*—D. A. Shifrin

[57] ABSTRACT

The present invention sets the position of each apparatus of a detecting system and an emitting system without using a reference disk in assembling an optical head. A light signal similar to reflected light of a reference disk is generated by a light modulator comprising a Faraday rotator for rotating a plane of polarization proportionally to the current by setting a solenoid coil having a large Faraday constant set around a piece of glass and electrifying the solenoid coil, a convex lens connected to a mechanism which moves along the optical axis in accordance with the applied current, a target section having a light detecting target with a groove formed on the surface and a light reflecting member set to the groove on the optical axis and connected to a mechanism moving along the radial direction of a disk in accordance with an applied current, so as to perform positioning by using the generated signal as a servo signal.

7 Claims, 4 Drawing Sheets

LIGHT MODULATOR AND OPTICAL HEAD ADJUSTMENT METHOD

FIELD OF THE INVENTION

The present invention relates to a light modulator for a light signal used to accurately align elements of an optical head and optical parts of an optical memory device at the manufacturing stage.

BACKGROUND OF THE INVENTION

An optical head applies a laser beam to an optical disk for optically recording information on a storage medium such as an optical disk, and reads recorded information through the reflected state of the laser beam. The optical head must have two functions. The first is an emitting function for applying a laser beam to an accurate position on a disk in an accurately focused state and, second, a signal detecting function for detecting the light reflected from the disk in the form of an electric signal. Information is stored on an optical disk in accordance with known methods. To read information, it is necessary to apply light accurately to the track and detect reflected light continuously. In the following description, a disk is referenced as a typical optical storage medium.

The emitting function is defined as a function for emitting a laser beam for recording and reproducing information to a disk serving as a storage medium, accurately adjusting the focus of the laser beam by moving an objective lens along the optical axis by an actuator to focus the laser beam on a fine area on the optical storage medium, and, tracking the laser beam to a track where a desired signal is recorded.

This operation must be performed continuously while the laser beam is emitted to the optical storage medium from the optical head because fluctuation occurs in a range of approximately 100 μm in the optical axis direction during rotation of the optical storage medium, in view of the planar accuracy of the medium, and a fluctuation range of about 50 to 100 μm in the radial direction of the medium surface during rotation of the medium, in view of the track forming accuracy. Therefore, it is necessary to continuously move the objective lens, by using the actuator, to apply the laser beam to the disk by keeping correct focus and a correct tracking state.

Information for detecting correct focus and a correct tracking state is included in the light reflected from the disk in the form of its intensity, wave front state, and polarization. The reflected light also includes information recorded on the optical recording medium. These pieces of information are read by a signal detecting optical system which includes information detecting optics, focus signal detecting optics, and track signal detecting optics. Focus and tracking information is fed back to the actuator and used as information for servo operation to have the laser beam correctly follow the track. Hereafter, a signal detected from light reflected from the disk as information for the servo operation is referred to as a servo signal.

Unless each of these detecting systems is set to a proper position when the optical head is manufactured, the servo signal cannot be accurately detected. Therefore, the servo operation cannot be performed for accurately applying the laser beam to the track of the optical recording medium.

In the case of the conventional optical disk drive, the diameter of the focused spot on a medium is approximately 0.9 μm, and the pitch between data tracks on it is 1.6 μm. As a result, an accuracy of approximately ±1 μm is required in the direction of the optical axis in the case of focus and an accuracy of approximately ±0.1 μm in the radial direction in the case of tracking. High-accuracy positioning of the focused spot is realized by the servo technique and high accuracy is required for servo signal detection for focusing and tracking. Therefore, as described above, highly accurate mechanical positioning is also required for assembling the signal-detecting optical systems of an optical head. In general, it is necessary to adjust the position of each part to an accuracy of several microns during assembly.

In assembling an optical head, the position of each detector in the optical head 920 has been determined by using an adjustment reference disk 901 as shown in FIG. 9 to optimize the detected servo-signal condition.

FIG. 2 is a schematic view of a separate optics-type optical head for the magneto-optical disk to be adjusted. A laser beam emitted from a laser diode 201 is converted to parallel rays by a collimator lens 203 and, moreover, converted to a shape close approaching a perfect circle by a beam circularizer 205; the direction of the beam is also changed. Then, the laser beam passes through a beam splitter 207, its direction is changed again by a reflective mirror 204 and the beam is thereafter focused by an objective lens 210 and applied to a reference disk 250. The laser beam reflected by the reference disk 250 include data signal and servo signals for focus and tracking, and returns to the beam splitter 207 through the same path. Then, the beam splitter 207 splits the reflected light in the direction of each detector for detecting focus and tracking signals and data information.

In FIG. 2, the focus state is detected by a quad-split detector 233 in branched reflected light. Reflected light passes through an amorphic lens 231 before it is introduced to the quad-split detector 233. Similarly, the tracking state is detected by a far-field detector 211 and the information stored in tracks is detected by an MO signal detector 225 after passing through a ½-wave plate 221 and a polarized beam splitter 223.

The focus state is described below in detail. The focus state is detected when reflected light reaches the quad-split detector 233 through the amorphic lens 231. The amorphic lens is defined as a lens whose focus differs in the x and y axes drawn on a plane vertical to the optical axis. To make the quad-split detector serving as a mechanism for detecting the focus state properly show its function, the amorphic lens and quad-split detector must be arranged at a predetermined interval in the direction of the optical axis. In this case, a positional error in the amorphic lens of no more than several tens of microns is permitted with regard to the quad-split detector. Also, a positional error of no more than several tens of microns or less in the x and y directions is permitted for the quad-split detector in the plane vertical to the optical axis.

The far-field detector 211 serves as a mechanism for detecting the tracking state. To make the detector 211 correctly detect the tracking state, however, a positional error in the detector 211 of no more than several hundreds of microns is permitted in each direction in the plane vertical to the optical axis.

For a magneto-optical (MO) disk, information is recorded on a recording medium by heating track spots on the disk surface with the laser beam with the disk being in a magnetic field. The direction of magnetization is detected in accordance with the polarized state of the disk surface based on the Kerr effect upon application of the laser beam. This is performed by detecting a light signal split by the polarized beam splitter 223 through the ½-wave plate 221 by the MO signal detector 225. Also, in the case of detection by the MO signal detector 225, the polarized direction of signal detection light must be rotated up to a predetermined angle in accordance with the state of the ½-wave plate 221, and the MO signal detector must be arranged at a predetermined position. In this case, it is necessary to limit the error of the rotation angle of the ½-wave plate to several degrees and the positional error of the MO signal detector in x and y directions on the plane vertical to the optical axis to several hundred microns or less.

Therefore, the step of assembling an optical head requires a process (tracking) for accurately setting the position of each detector. Conventionally, a reference disk is used to position detectors as shown in FIG. 9. In this case, a laser beam is applied to the disk to determine the position of each detector so that the detection state is optimized by monitoring the reflected light of the laser beam by a proper means.

At the stage of positioning, to obtain positioning information using a reference disk for adjustment, a servo signal must show the focus or tracking state. In realizing the above mentioned, a light spot must be properly focused on a track of the disk. At the beginning of this adjustment, however, the position of each detector is very roughly set and the position of each detector not yet optimized. The positions of detectors are then adjusted repeatedly until signals are optimized. Therefore, it is very difficult to obtain accurate information by detecting the servo signal for focus and tracking with the light reflected from the reference disk.

To be specific, a method is used in which focus and/or tracking signals are observed, respectively, and adjustments are adjusted one by one so that the position of each component approaches a point where all signals are optimized. However, both the focus and tracking signals are generated simultaneously by a reference disk for adjustment, and it is difficult to separately generate one from the other, and mutual interference of the signals cannot be avoided. Moreover, an adjustment frequently influences a plurality of signals because of the structure of the optical head. Therefore, it is estimated that a problem lies in the method for adjustment using a reference disk.

OBJECTS AND SUMMARY OF THE INVENTION

The problem of the conventional adjusting method lies in the fact that the reliability of signals coming from a reference disk serving as an index for adjustment is low, because these signals are influenced by the characteristics of servo circuits and actuators, while they simultaneously interfere each other. It is an object of the present invention to position a detector without using a signal coming from the reference disk.

More concretely, an apparatus is disclosed which generates a modulated light signal from a laser beam which contains information for focusing, tracking, and data signals for adjustment similar to the reflected light generated by a laser beam applied to the reference disk. The light modulator of the present invention is able to generate three types of light signal, such as a recording signal, focus error signal, and tracking error signal, individually in accordance with the input electric signal. A laser beam is emitted from an optical head to be adjusted, then it is modulated by an objective lens (focus) driven by a piezoelectric element, a target (tracking) driven by a piezoelectric element or liquid crystal, and a Faraday rotator (in the case of magneto-optical recording) and returned to the detecting system of the optical head again.

The adjustment method of the present invention makes it possible to adjust not only an integral head but fixed optics of a head using a separate optical system in which a fixed optical system (laser and light detecting system) is physically separated from a moving optical system (objective lens and mirror). In this case, because alignment between the fixed and moving optical systems is necessary, information for setting a position is obtained by arranging a beam splitter between a light modulator and the head to be adjusted to branch some of the light and providing a means for measuring the beam position.

The beam splitter is arranged between the light modulator and the head to be adjusted to branch some of the light and perform direction adjustment of the laser beam emitted from the head (adjustment of setting position of a collimator lens in the x-y direction) and approximate collimation (adjustment of setting position in the z direction).

The head optical system is confirmed by setting a microscope for observing a laser spot formed by the objective lens at a position where the target of the light modulator can be observed.

The foregoing and other objects, features and advantages of the invention will be apparent from the following more particular description of preferred embodiments of the invention, as illustrated in the accompanying drawings.

DETAILED DESCRIPTION

The light modulator of the present invention relates to an apparatus for freely reproducing a light signal for finding an adjustment point where each signal is optimized under an actual operating state in accordance with an electric signal input without using any disk for adjustment in the assembly and adjustment of a head for an optical disk. Details are shown in FIG. 1.

Figure 1:
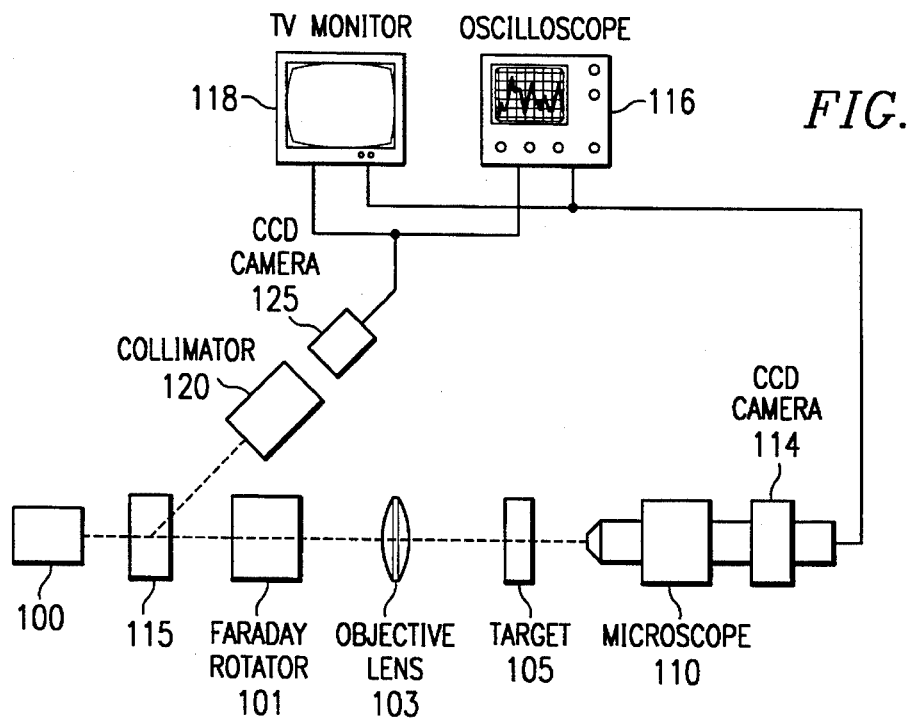
FIG. 1 shows the light modulator of the present invention.
Figure 3:
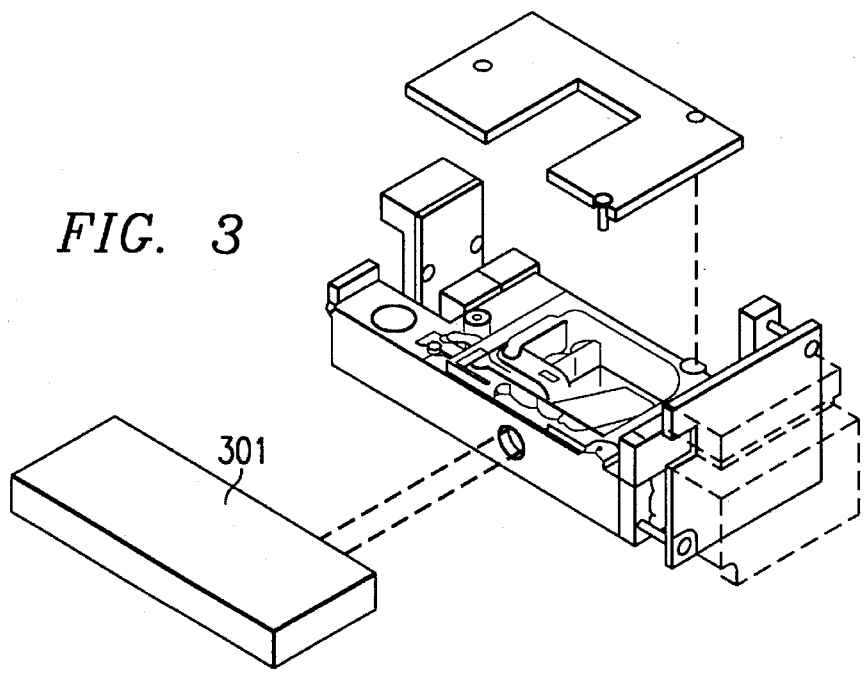
FIG. 3 shows a schematic view for explaining the adjustment of an optical head by using the light modulator of the present invention.

A head to be assembled and adjusted is set on the holder section 100 in FIG. 1. Comparison with the existing method is shown in FIG. 3. That is, the light modulator 301 of the present invention is provided instead of an existing reference disk (and an objective lens). The light modulator makes possible the independent generation of three types of signal which could not be independently controlled by a conventional system when an adjusting disk and an objective lens in accordance with a control input electric signal were used. This is performed by a mechanism for generating a signal for adjusting an apparatus for detecting MO, focus, and tracking signals by passing a laser beam emitted from a head to be assembled and adjusted through the Faraday rotator 101, objective lens 103, and target section 105 so as to modulate it.

Figure 4:
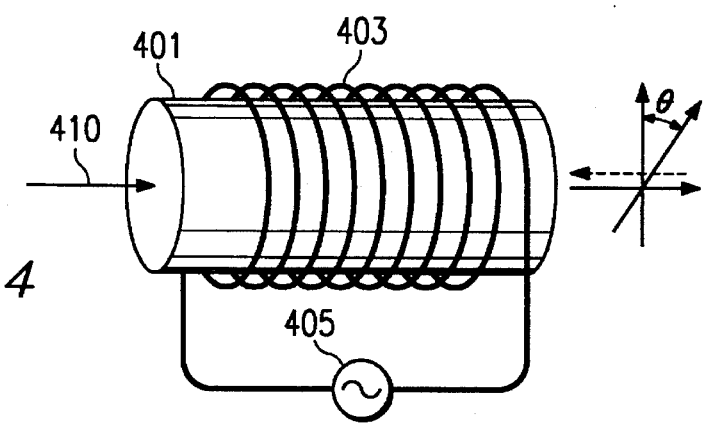
FIG. 4 shows the mechanism of a Faraday rotator.

FIG. 4 shows the details of the Faraday rotator 101. The Faraday rotator generates a magnetic field by applying current to a solenoid coil 403 wound around material 401 made of glass with a large Faraday constant inserted into an optical path 410 so as to generate the rotation Θ of a polarization plane approximately proportional to current. The current is adjusted by a power supply 405. A rotation-angle signal of polarized light similar to a Kerr rotation signal in the case of a Magneto-optical disk is thereby generated.

Figure 5:
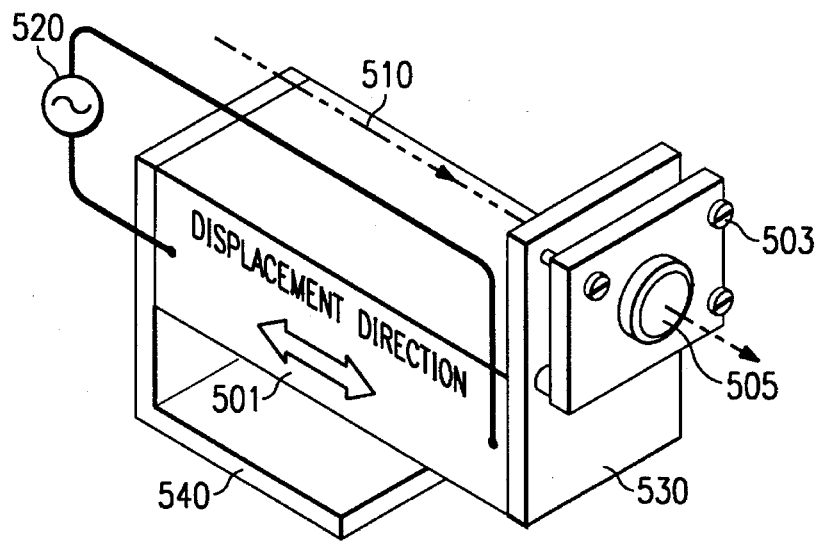
FIG. 5 shows the mechanism of an objective lens.

FIG. 5 shows the detail of the objective lens 103. An objective lens 505 is mounted on a lens mounting 503 having a flap adjustment function combined with an actuator 501, such as a piezoelectric element, for driving along the optical axis 510, and the lens mounting is connected to a moving part 530 so as to generate a signal for detecting a focus state by applying a voltage to the piezoelectric element from a power supply 520 in order to drive it. The whole of this section is secured on a head by a securing portion 540. It is preferable to use, for example, a laminated piezoelectric element for the piezoelectric element.

Figure 6:
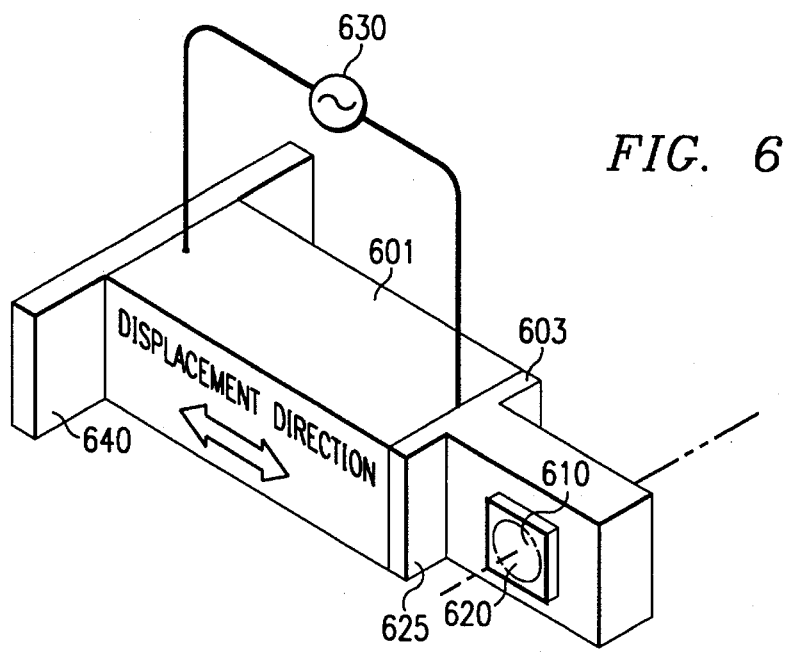
FIG. 6 shows a target section.

The target section 105 has a light focusing target 610 on its optical axis as shown in FIG. 6. The light focusing target 610 is secured to a mounting 603 having a flap adjustment function combined with an actuator 601, such as a piezo-electric element, for driving along the radial direction of a disk to constitute a moving part 625 and the optical axis 620 becomes vertical to the light focusing target. The actuator 601 is moved by a power supply 630 in a direction vertical to the optical axis. The whole of this section is secured to a securing portion 640.

Figure 7:
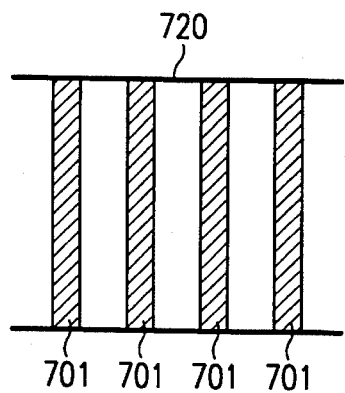
FIG. 7 shows a detail of the surface of a light detecting target.

FIG. 7 shows an enlarged view of the surface of the light detecting target 610. Tracking guide grooves 701 are formed on the surface of the light detecting target at an interval which is the same as the track interval, and a reflecting film 720 is attached to the surface. The reflecting position of a laser beam is adjusted by moving the reflecting film by use of the actuator so as to generate a tracking signal. In this case, it is also preferable to use, for example, a laminated piezoelectric element for the piezoelectric element.

This type of signal generation can be performed not only by a method according to mechanical driving but also by a nonmechanical method using a liquid crystal or Acousto-optic element.

In FIG. 1, a reflecting film layer on the light focusing target 105 serves as a half mirror so that the state of a laser beam focused on the mirror can be observed by a microscope 110. This information can be also observed by an oscilloscope 116 or a TV monitor 118 through a CCD camera 114. This has a function as a means for confirming whether the distance between the objective lens 103 and the target 105 is proper, focusing has been correctly carried out, or a beam has no aberration. This type of beam state observation is not realized by the conventional adjustment method using a reference disk.

In FIG. 1, a laser beam is detected prior to modulation by an image sensor (not illustrated) in a CCD camera 125 (it is necessary to remove the lens of the CCD camera) through a collimator lens 120. Thus, it is possible to detect that an emitting optical system is accurately collimated, and that an emitting angle is proper, by detecting the laser beam by the image sensor through the collimator lens. In the case of the conventional method using a reference disk, it is necessary to adjust the emitting system in another step before setting the focus and tracking detecting systems. However, the present invention makes it possible to perform these operations in one step.

By leading the light branched by a beam splitter 115 to the image sensor in the CCD camera 125 (if a lens attached to the CCD camera is used, it is necessary to remove it) without passing through the collimator lens 120, it is possible to detect the deviation of the emitted position of the laser beam emitted from an emitting system as well as determine information on the position for setting a fixed optical system or an objective lens.

Figure 2:
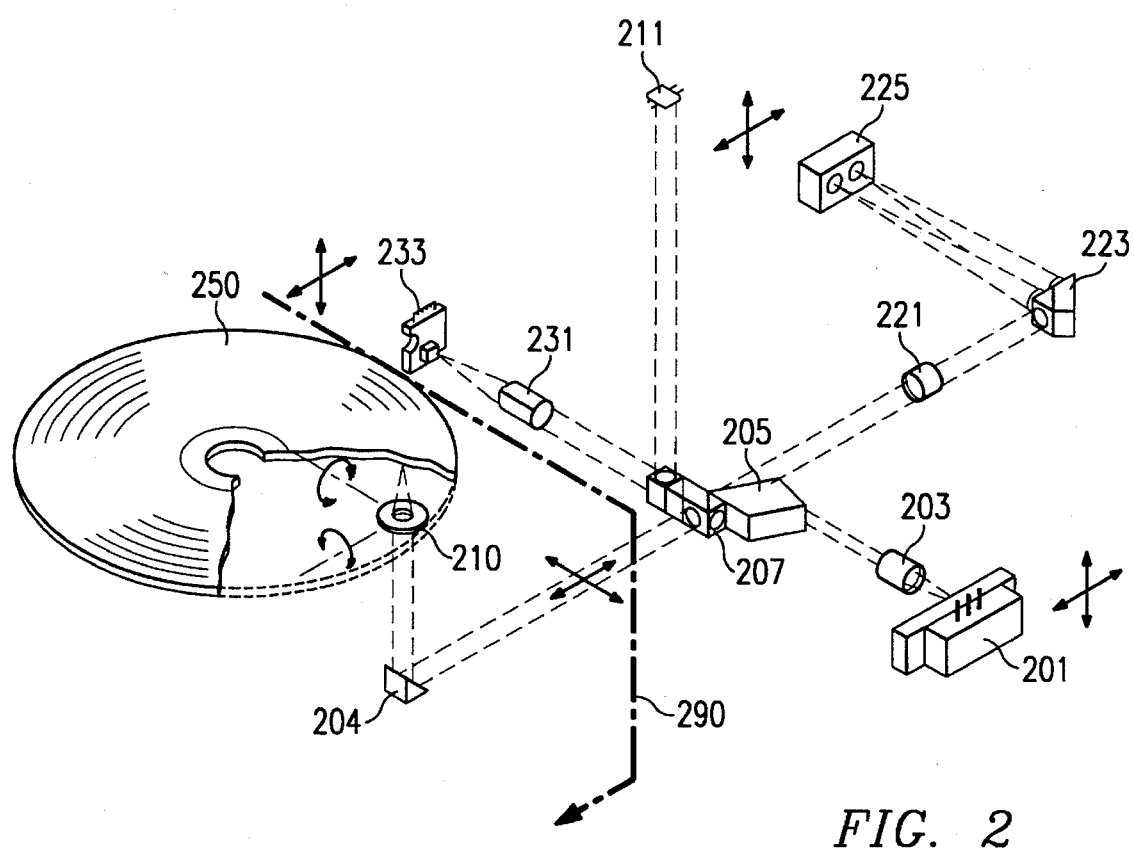
FIG. 2 shows an optical head according to the prior art and the detail of an adjusting disk.

The following is the description of a method for positioning each detector of an optical head by using the light modulator of the present invention. As shown in FIG. 3, the light modulator in FIG. 1 is used instead of the reference disk 250 and objective lens 210. To adjust a focus-error detecting optical system, the collimated light emitted from a head to be adjusted must be correctly focused on the target 105. The light reflected from the target is directed to the quad-split detector 233 through the anamorphic lens 231 shown in FIG. 2. To adjust the focus system, the anamorphic lens 231 should be aligned with the quad-split detector 233 and to set the distance between them to a predetermined value. These adjustments are performed by the known method using reflected light.

Also for adjustment of tracking and MO signal detection, it is necessary to properly modulate a laser beam by the apparatus of the present invention and to perform adjustment with the existing method by using the modulated laser beam.

An emitting system can also be adjusted by the light branched by the beam splitter 115. Adjustment is performed by moving the collimator lens 203 along the optical axis in accordance with the information detected by the light detecting element in the CCD camera 125 if a problem lies in collimation. Unless the emitting angle is proper, it is necessary to adjust the position in a plane vertical to the optical axis of a laser diode.

Figure 8:
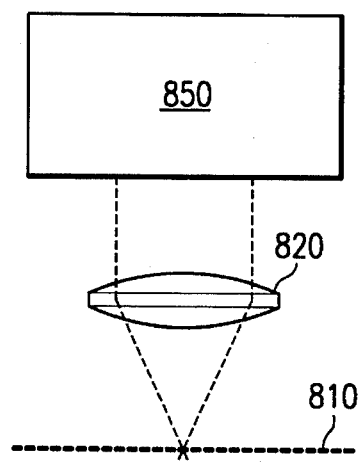
FIG. 8 shows an application of the present invention.
Figure 9:
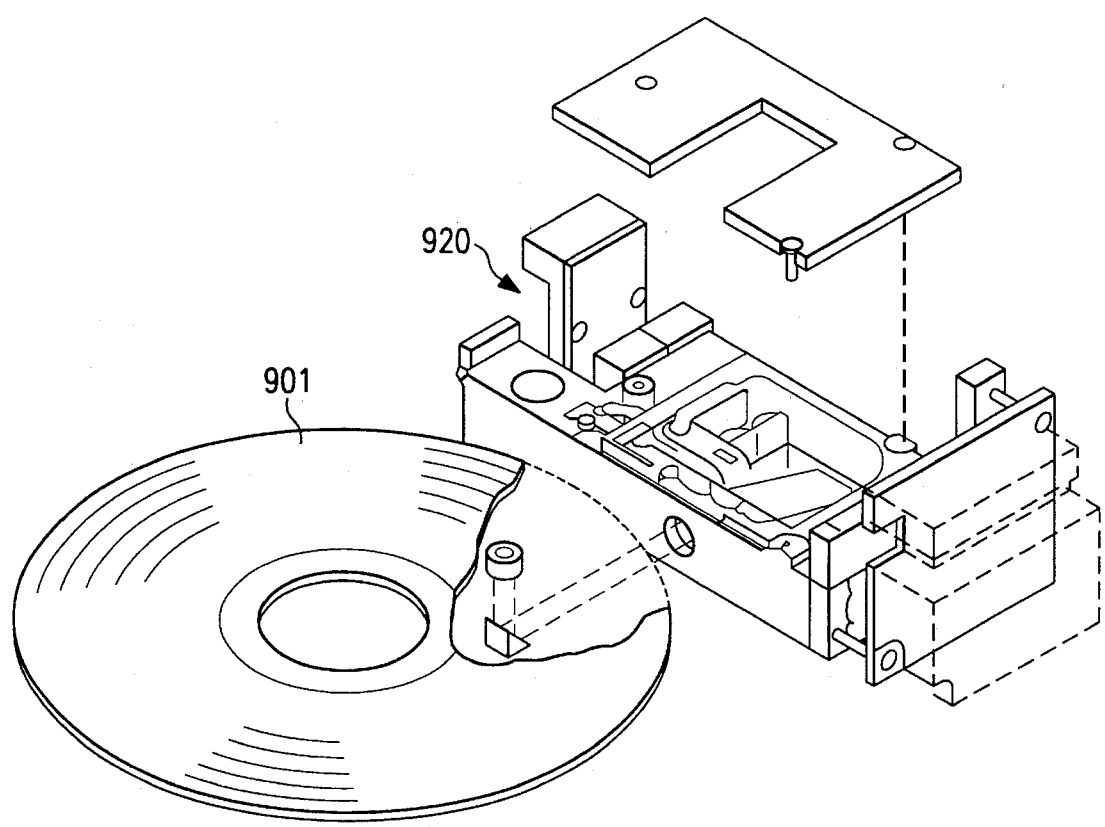
FIG. 9 shows a schematic view for explaining a method for adjusting an optical head by using a reference disk according to the prior art.

As shown in FIG. 8, the head of an integral optical system may use a finite optical system for directly applying the light emitted from a laser 801 to an objective lens 805 through a half mirror 803 without using a collimator lens. In this type of head, the disk surface is present at the focus shown by a dotted line 810. For this type of head, as shown in FIG. 8, it is possible to perform adjustment by the same method after separately setting a lens 820 for collimation at the entrance of the light modulator of the present invention and transforming the laser beam into an infinite-system beam.

In this case, it is necessary to adjust the relative position between the optical head portion (portion lower than 805) and the portion (portion upper than 820) of the present invention in FIG. 8 along the optical axis and a plane vertical to the optical axis so that the focus and its position are aligned. The apparatus of the present invention achieves alignment by using only a CCD camera 125 and focusing by using both a CCD camera 125 and collimator 120. These operations are more accurately performed by using a monitoring CCD camera 114 and oscilloscope 116, which are connected to a microscope. That is, a spot on a target is monitored by the CCD camera 114 and its light intensity is measured by the oscilloscope.

In this specification, it is described that a disk is used as a recording medium. However, it is clear that the present invention can be applied to a magnetic card and other media.

Because the optical head of a detecting system can be positioned without using a reference disk, that is, without performing any servo operation, there are only a few indeterminate factors for positioning and therefore positioning can be effectively performed.

While the invention has been particularly shown and described with reference to preferred embodiments thereof, it will be understood by those skilled in the art that various changes in form and detail may be made therein without departing from the spirit and scope of the invention.

What is claimed is:

1. An apparatus for adjusting elements of an optical-head during manufacture without using a reference medium, comprising:

a Faraday rotator including a solenoid coil set around a piece of glass having a large Faraday constant, said solenoid coil for rotating a plane of polarization of a laser beam by applying current to said solenoid coil, said rotation occurring in a manner proportional to said applied current;

an objective lens connected to a first mechanism which moves along an optical axis direction of said laser beam in accordance with current applied or voltage charged therein; and a target means having at least one groove at a surface and connected to a second mechanism moving along the direction perpendicular to a track of a storage medium in accordance with current applied or voltage charged therein, said groove having a light reflecting member on said optical axis.

2. The apparatus according to claim 1, wherein said first mechanism or said second mechanism, or both, includes an actuator to be driven by a piezoelectric element.

3. The apparatus according to claim 1, further comprising a microscope for observing a beam spot of said laser beam focused on the target section.

4. The apparatus according to claim 1, further comprising a beam splitter set on said optical axis for observing said laser beam with a television camera.

5. The apparatus according to claim 1, further comprising a convex lens for modifying a finite-system laser beam into an infinite-system laser beam set on the optical axis.

6. A method for adjusting elements of an optical-head during manufacture without using a reference medium, comprising the steps of:

modulating a laser beam by:

transmitting the laser beam through a Faraday rotator having a solenoid coal set around a piece of glass having a large Faraday constant, the solenoid coil for rotating a plane of polarization of the laser beam by applying current to the solenoid coil, the rotation occurring in a manner proportional to the applied current;

transmitting the laser beam through an objective lens connected to a first mechanism which moves along an optical axis direction of the laser beam in accordance with current applied or voltage charged therein; and transmitting the laser beam onto a target to be at least partially reflected thereby, the target having at least one groove at a surface and connected to a second mechanism moving along the direction perpendicular to a track of a storage medium in accordance with current applied or voltage charged therein, the groove having a light reflecting member on the optical axis;

detecting the laser beam after it has been reflected off of the target;

generating a servo signal from the detected laser beam; and determining a position of each element in a detecting system of the optical head based upon the generated servo signal.

7. A method for adjusting elements of an optical-head during manufactors without using a reference medium, comprising the steps of:

modulating a laser beam by:

transmitting the laser beam through a Faraday rotator having a solenoid coil set around a piece of glass having a large Faraday constant, the solenoid coil for rotating a plane of polarization of the laser beam by applying current to the solenoid coil, the rotation occurring in a manner proportional to the applied current;

transmitting the laser beam through an objective lens connected to a first mechanism which moves along an optical axis direction of the laser beam in accordance with current applied or voltage charged therein; and transmitting the laser beam onto a target to be at least partially reflected thereby, the target having at least one groove at a surface and connected to a second mechanism moving along the direction perpendicular to a track of a storage medium in accordance with current applied or voltage charged therein, the groove having a light reflecting member on said optical axis;

translating a light path of a definite system into an infinite system by setting a convex lens on the optical axis of the definite-system laser beam;

detecting the laser beam after it has been reflected off of the target;

generating a servo signal from the detected laser beam; and determining a position of each element in a detecting system of the optical head based upon the generated servo signal.

* * * * *